(12) United States Patent
Wang

(10) Patent No.: US 9,176,953 B2
(45) Date of Patent: Nov. 3, 2015

(54) METHOD AND SYSTEM OF WEB-BASED DOCUMENT SERVICE

(75) Inventor: Donglin Wang, Beijing (CN)

(73) Assignee: Tianjin Sursen Investment Co., Ltd., Tianjin (CN)

( * ) Notice: Subject to any disclaimer, the term of this patent is extended or adjusted under 35 U.S.C. 154(b) by 276 days.

(21) Appl. No.: 13/271,165

(22) Filed: Oct. 11, 2011

(65) Prior Publication Data

US 2012/0096342 A1    Apr. 19, 2012

Related U.S. Application Data

(63) Continuation-in-part of application No. 12/133,296, filed on Jun. 4, 2008, now Pat. No. 8,645,344, and a continuation-in-part of application No. 12/133,280, filed on Jun. 4, 2008, now abandoned, and a continuation-in-part of application No. 12/133,309, filed on Jun. 4, 2008.

(60) Provisional application No. 61/392,167, filed on Oct. 12, 2010.

(51) Int. Cl.
*G06F 17/30* (2006.01)

(52) U.S. Cl.
CPC ............................... *G06F 17/30011* (2013.01)

(58) Field of Classification Search
CPC combination set(s) only.
See application file for complete search history.

(56) References Cited

U.S. PATENT DOCUMENTS

| | | | |
|---|---|---|---|
| 2002/0116418 A1* | 8/2002 | Lachhwani et al. | 707/517 |
| 2003/0093565 A1* | 5/2003 | Berger et al. | 709/246 |
| 2003/0221167 A1* | 11/2003 | Goldstein et al. | 715/513 |
| 2005/0102258 A1* | 5/2005 | Tecu et al. | 707/1 |
| 2005/0270553 A1* | 12/2005 | Kawara | 358/1.13 |

* cited by examiner

*Primary Examiner* — Syed Hasan

(57) ABSTRACT

A method and system for web-based document service are provided. The method in the cloud side may include: receiving the data backed up automatically, retrieving the visual appearance of the backed up data and saving the retrieved visual appearance into a universal data and storing the universal data in cloud side, converting the universal data into a format supported browser.

12 Claims, 5 Drawing Sheets

METHOD AND SYSTEM OF WEB-BASED DOCUMENT SERVICE

RELATED APPLICATIONS

This application claims to the benefit of U.S. Provisional Patent Application No. 61/392,167, filed Oct. 12, 2010, and entitled "A web-based document service," and is hereby incorporated herein by reference.

This application is a continuation-in-part of U.S. patent application Ser. No. 12/133,296, filed Jun. 4, 2008 now U.S. Pat. No. 8,645,344, and entitled "Document processing system and method therefor," and is hereby incorporated herein by reference.

This application is a continuation-in-part of U.S. patent application Ser. No. 12/133,280, filed Jun. 4, 2008 now abandoned, and entitled "Document processing method," and is hereby incorporated herein by reference.

This application is a continuation-in-part of U.S. patent application Ser. No. 12/133,309, filed Jun. 4, 2008, and entitled "A document data security management method and system," and is hereby incorporated herein by reference.

BACKGROUND

Nowadays, cloud services have become a trend. There are several kinds of cloud services that can be used to handle documents. Google Docs is the most featured one, and allows users to manually upload their documents to the cloud, and view, edit and share documents in the cloud. But Google Docs cannot automatically upload desktop (PC, Mac, etc.) documents to the cloud. Even though you manually upload your document to the cloud, the uploaded document often looks slightly or even extremely different than the original desktop document. This is because Google converts the uploaded document to Google's format, but its conversion technology cannot retain the layout (or visual appearance) of the original document.

Dropbox is another successful document cloud service. Dropbox users need to install Dropbox client software on every device (PC, Mac, cell phone, iPad) they use. Dropbox's client software then creates a Dropbox folder, all Dropbox folders owned by the same user are synced (so the user always has the same files), and then the user can drop a file into the Dropbox folder on any of his devices in order to use it later in another device. But Dropbox only provides a document storage service. It doesn't provide viewing or editing functions, and users must install the desktop software (e.g., MS Office) to open documents stored in the Dropbox folder. Furthermore, the Dropbox folder is a specific folder created by Dropbox, so users cannot access any documents that are not stored in the Dropbox folder in the cloud.

Google Docs, Dropbox and all other document cloud services do not allow users to view their own documents through a web browser only, and also cannot provide a document in the browser that looks exactly the same as it does on the desktop.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In an embodiment of the invention, a method and system for web-based document service are provided. The method in the cloud side may include: receiving the data backed up automatically, retrieving the visual appearance of the backed up data and saving the retrieved visual appearance into universal data and storing the universal data in the cloud side, converting the universal data into a format supported browser.

By using the method provided by the invention, when a user accesses the web-based document service, he/she can view his/her data using only a browser of any device without any plug-in or other installed software (such as MS Office or PDF Reader). The method also ensures that the layouts of the universal data in different device (PC, mobile terminal, tablet, Mac etc) are the same.

Within this document, layout is the visual appearance of a document; Universal data is the data which is able to accurately describe arbitrary layout, it records the post-typesetting information, no re-typesetting is needed for presenting (displaying, priting etc.); flowable data (such as MS Word document) records the pre-typesetting information of a document, re-typesetting (e.g. figuring the position of each character) is needed for presenting, thus the layouts of same flowable data presented by different software, or presented on different device, may be differed.

The terms in this invention can refer to a patent which application Ser. No. is 12/133,290.

Figure 1:
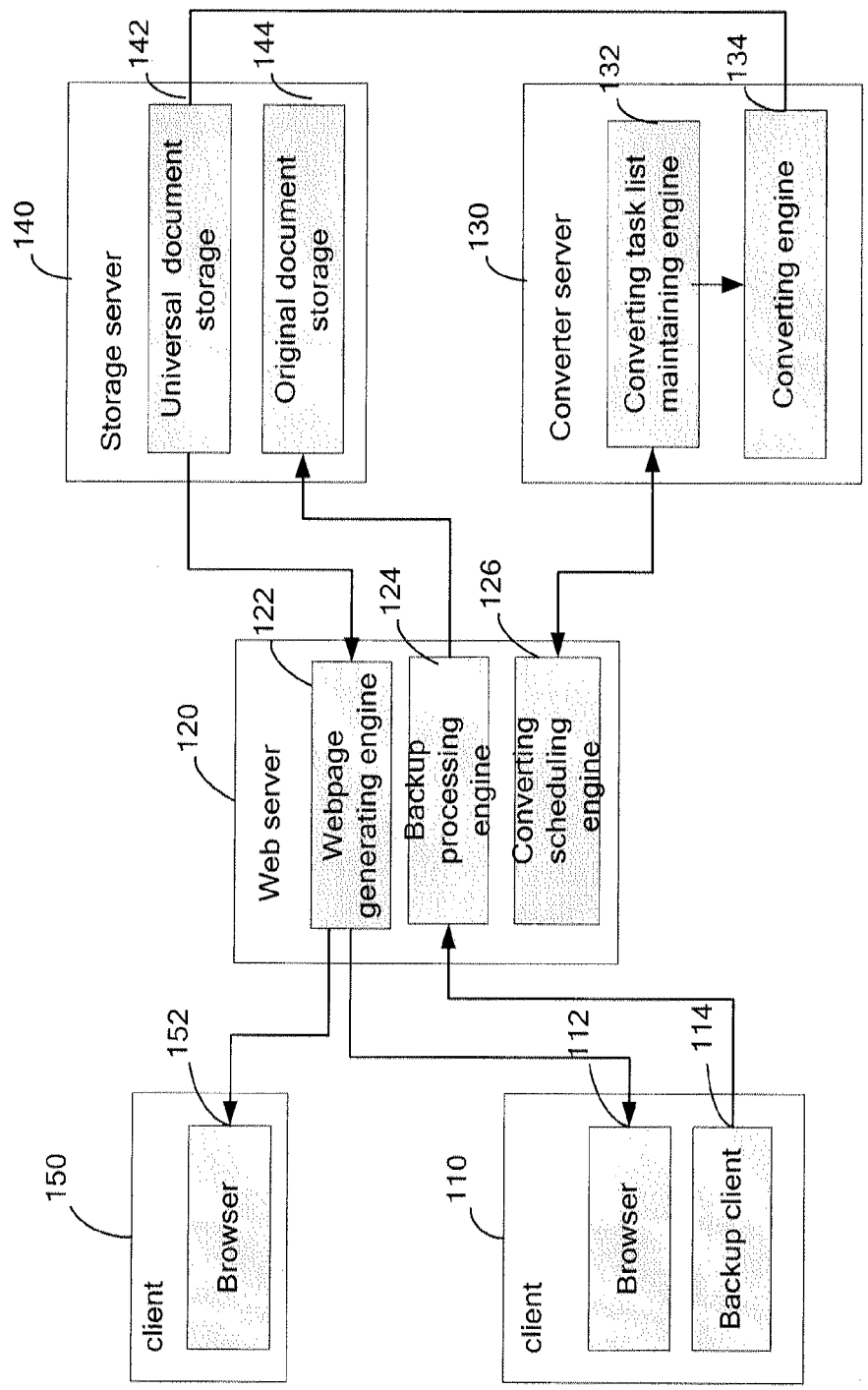
FIG. 1 depicts an example of a system diagram illustrating a system of a web-based document service.

FIG. 1 depicts an example of a system diagram illustrating a system of a web-based document service. In the example of FIG. 1, the system 100 includes a client 110, such as Windows PC, Mac, laptop, or other device which contains browser 112 and installs backup client 114 software, and a client 150 which may only have a browser 152. System 100 may also include a web server 120 connected with those clients via a network, a storage server 140 and a converter server 150. From the client side, the three servers in combination can be called cloud side. Herein, those skilled in the art can understand, only one client 110, one client 150, one web server 130, one storage server 140 and one converter server 150 are illustrated for the purposes of simplicity. In practice, there may be many clients and/or servers. The collaboration of numerous servers will be described later.

Initially, a user installs the backup client 114 in the client 110. After the user sets up a backup setting which includes the files/folders user want to backup to the cloud side, the backup client 114 will automatically back up the data included in the backup setting to the cloud side.

At the cloud side, the data the user uploaded are stored in the storage server 140. Then, the web server 120 and the converter server 130 interact with each other to convert printable documents in the storage server 140 to universal data, which can be displayed in the browser directly. In the embodiment, since the universal data itself are supported by the browser, the step of converting the universal data into a format supported browser is not needed. Herein, a method of converting printable documents into universal data is abstracting the visual appearance information of printable document (an embodiment of abstracting can refer to a patent which application Ser. No. is 12/133,290), and then recording the visual appearance information into universal data. In one embodiment, the universal data is SVG (Scalable Vector Graphics) format, and each page of a printable document forms one SVG object, so the universal data corresponding to the printable document is composed of a number of SVG objects, wherein the number of SVG objects equal to the number of pages of the printable document.

Finally, when a user requests to access the document backed up to the cloud via the browser 112 of the client 110, or browser 152 of the client 150, the request is sent to web server 120, web server 120 generates a webpage based on the universal data corresponding to the requested document and submit the webpage to the browser 112 of the client 110, or browser 152 of the client 150. An option of conversion from universal data to a format which can be rendered by browser may be needed. However, in this embodiment, supposed universal data itself can be rendered by browser, the conversion is not needed, so engine for converting the universal data to a format rendered by browser is not shown, those skilled in the art can understand in some embodiment the engine may be needed. After that, the user can read or print the requested document through the browser. Other operations such as editing, saving, sharing are applicable, the details will be described later.

When there are a lot of web servers 120 and converter servers 130 to support a high traffic service, there exist (but not limited to) two methods for the interaction between the web server 120 and the converter server 130.

In one embodiment, the web server 120 maintains a to-be-converted document list, and pushes a subset of the to-be-converted document list to one of converter servers 130. After the converter server receives its own to-be-converted document list, converts document in the to-be-converted document list to universal data, returns the converted data to the web server 120, and web server 120 stores the converted data to storage server 140, the web server 120 deletes the converted document from the to-be-converted document list it maintains. In this case, any of the converter servers 130 must be able to be accessed by the web server 120 (e.g. the converter servers 130 need have a fixed IP address) to push a converting task.

In another embodiment, when one of converter servers 130 initiates a converting request to the web server 120; the web server 120 responds the converting request with a to-be-converted document list including the information of the documents needs to be converted by the converter server 130. After the said converter server receives its own to-be-converted document list, converts document in the to-be-converted document list to universal data, returns the converted data to the web server 120, and web server 120 stores the converted data to storage server 140, the web server 120 deletes the converted document from the to-be-converted document list it maintains. In this case, the web server 120 must be able to be accessed by the converter servers 130 to request a converting task.

Optionally, the converter server 130 stores the universal data to the storage server 140, instead of submitting it to the web server 120 and then web server 120 storing it to the storage server 140.

Optionally if the converter server 130 does not return the universal data within a preset time, the web server 120 will consider that this task has failed and re-distribute the task later. Herein, the preset time can be set by statistical data or in another way.

In the above embodiments, the conversion is performed by the converter server 130. Optionally, the converting function can be implemented in client 110. For example, the converting software can be embedded in the backup client 114. In this case, the converter server 130 and converting scheduling engine (described below) are not necessary. In one embodiment, the backup client 114 uploads the backed up document to the web server 120, converts the backed up document to universal data, and uploads the universal data to the web server 120.

From the above description, it can be seen that, the web server 120 may includes backup processing engine 124, adopted to receive the data user back up from the client side, and store the data in the storage server 140; converting scheduling engine 126, adopted to maintain a the converting task list and schedule the converting task to converter server, after the converter server completes its converting task, updates the converting task list it maintain; webpage generating engine 122, adopted to generate a webpage according to universal data, this webpage is submitted to client's browser. The converter server 130 includes converting task list maintaining engine 132, adopted to retrieve the converting task list from web server 120 actively or passively; and converting engine 134, adopted to convert the document in the converting task list to the universal data to record the visual appearance information of the document. The storage server 140 includes the universal data storage 142, adopted to store the universal data, and the optional original document storage 144, adopted to store the original data user backs up from the client side.

In one embodiment, user can use third party's account (such as OpenID, Google account, Facebook account, Twitter account, Yahoo account) to log in web server 120. Thus the user identification can be performed by third party, and the third party's user need not sign up again to use this service.

In an embodiment, a user may provide the web server 120 with an account of a third party storage service (such as Google Docs, box.net), and authorize the web server 120 to access the data in his own account of the third party storage server. After that, the web server 120 can access the server of the third party storage service via the API provided by the third party storage service to retrieve the documents stored on the server, and converts the documents retrieved to universal data by adopting converter server 130. The universal data can be stored in the server of the third party storage service, or in the storage server 140. Thus the user can view/print his documents stored in the server of third party storage service via web server 120.

Figure 2:
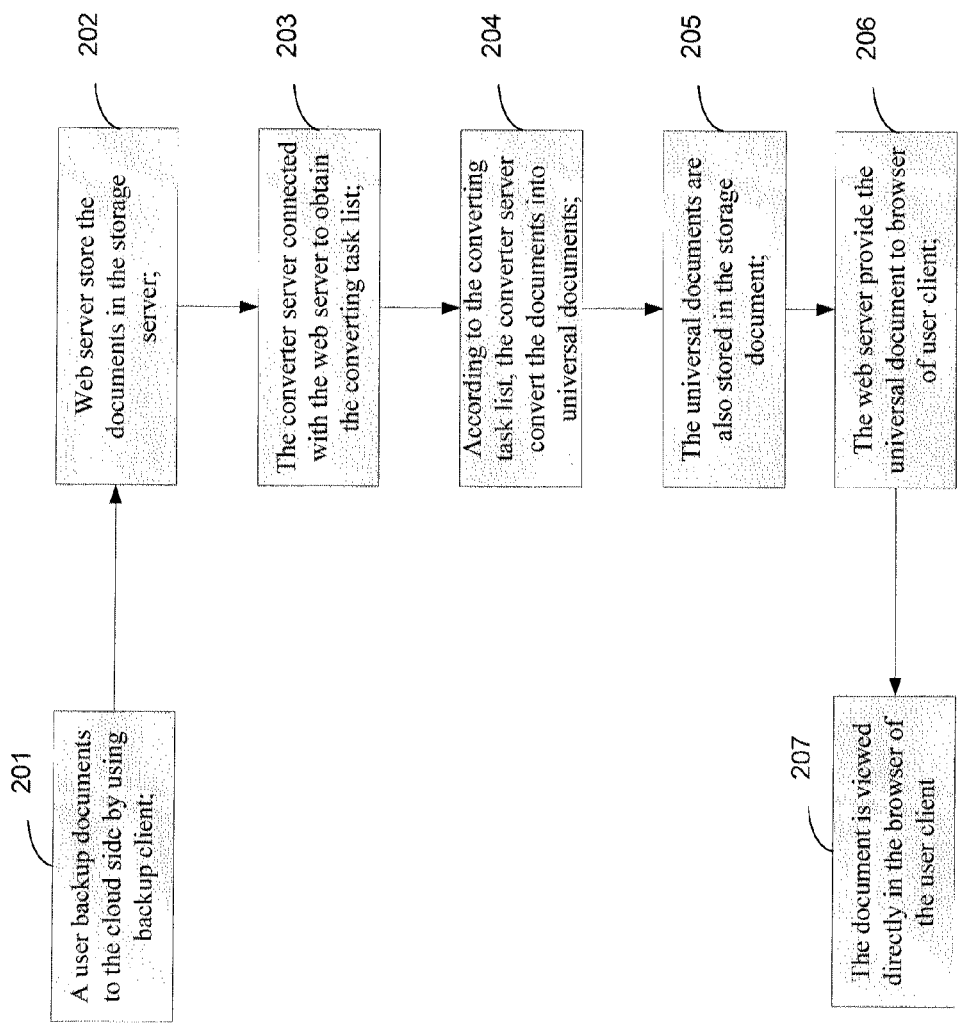
FIG. 2 depicts an example of a flowchart of a process to support web-based document server.

FIG. 2 depicts an example of a flowchart of a process to support web-based document server. In the example of FIG. 2, the method mainly includes following steps:

Step 201: A user's documents are uploaded to the cloud side by using backup client (automatically or manually);

Step 202: Web server stores the uploaded documents in the storage server;

Step 203: The converter server connected with the web server obtain the converting task list;

Step 204: According to the converting task list, the converter server converts the documents into universal data;

Step 205: The universal data are stored in the storage server;

Step 206: The web server submits the web page contains the universal data to browser of user's client, or the web server convert the universal data into a format which can be rendered by the browser and submits the web page contains the converted data to browser of user's client Step 207: The document is viewed directly through the browser of the user's client.

Herein, all features in the FIG. 1 can be employed in the process of FIG. 2. For simplify, those features are not described repeatedly.

Figure 3:
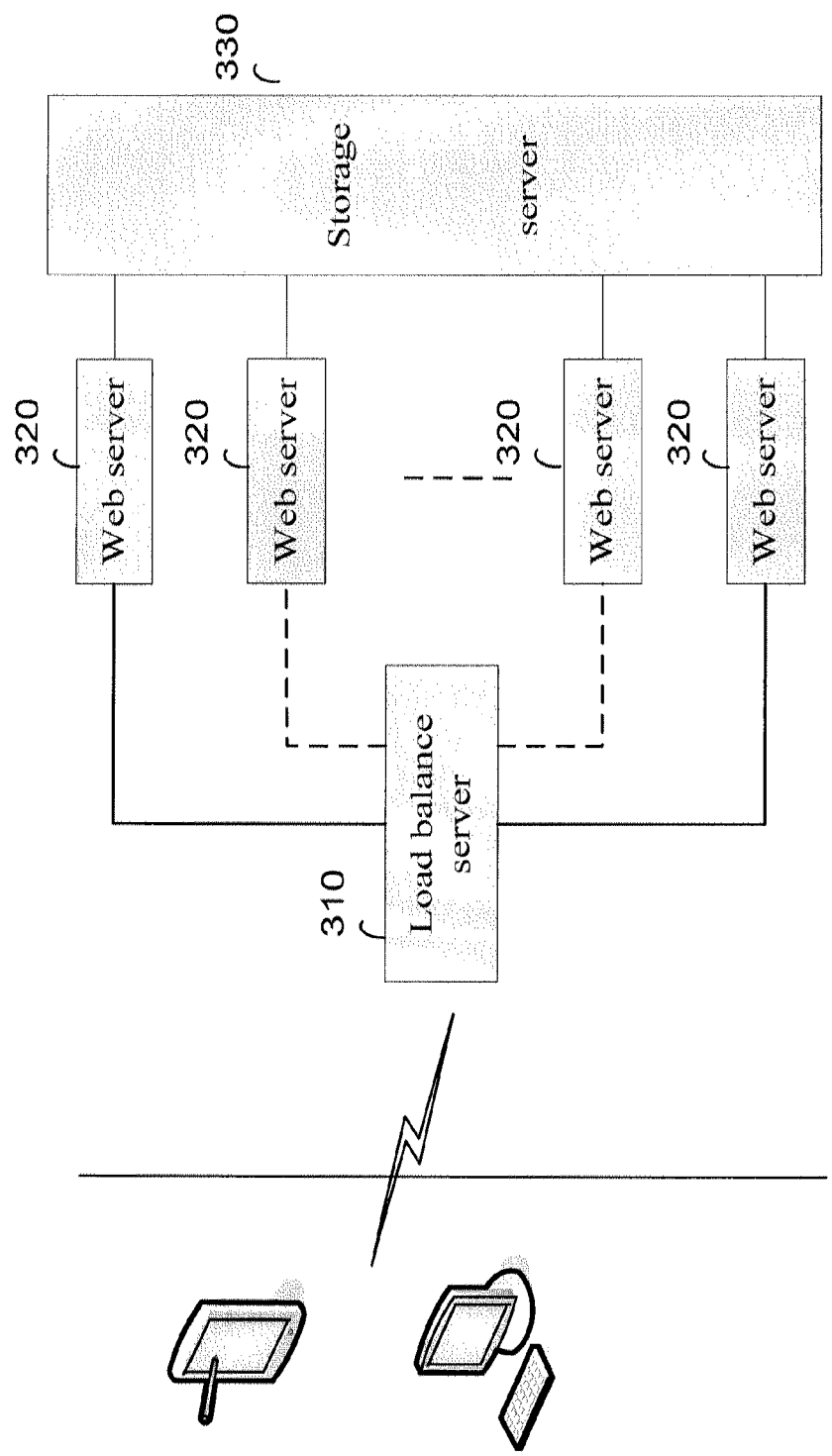
FIG. 3 is a diagram illustrating an example of collaboration of the web server and the storage server shown in FIG. 1.

Following figures will mainly focus on the collaboration of the web server and the storage server. FIG. 3 is a system 300 which includes a load balance server 310, a number of web server 320, and one storage server 330. Users' data are all stored in the storage server 330. Users may send requests to web server 320 to access the data in the storage server 330. Those requests are first processed by the load balance server 310, and then the load balance server 310 distributes the requests to a specific web server 320, and the web server 320 obtains data from storage server. I.e., although those users' requests are processed by different web server 320, finally, access the same one storage server 330. Those skilled in the art can understand that though only one storage server 330 is shown in FIG. 3, it only illustrate the interface of the web servers 320 and the storage server 330. In practice, the storage server 330 itself may be in complicated structure such as SAN or NAS. However, in this situation, it is very expensive to build the storage server 330, most important, the number of the web servers 320 supported by one storage server is limited. It means once the traffic of the web-based document service increases abruptly and more web servers 320 are needed, but due to the limitation of the number of the web server 320 supported by one storage server 330, simply expanding the number of web server 320 can not improve the process ability of the whole service, and finally it results in the storage server 330 become the bottleneck of the entire service.

Figure 4:
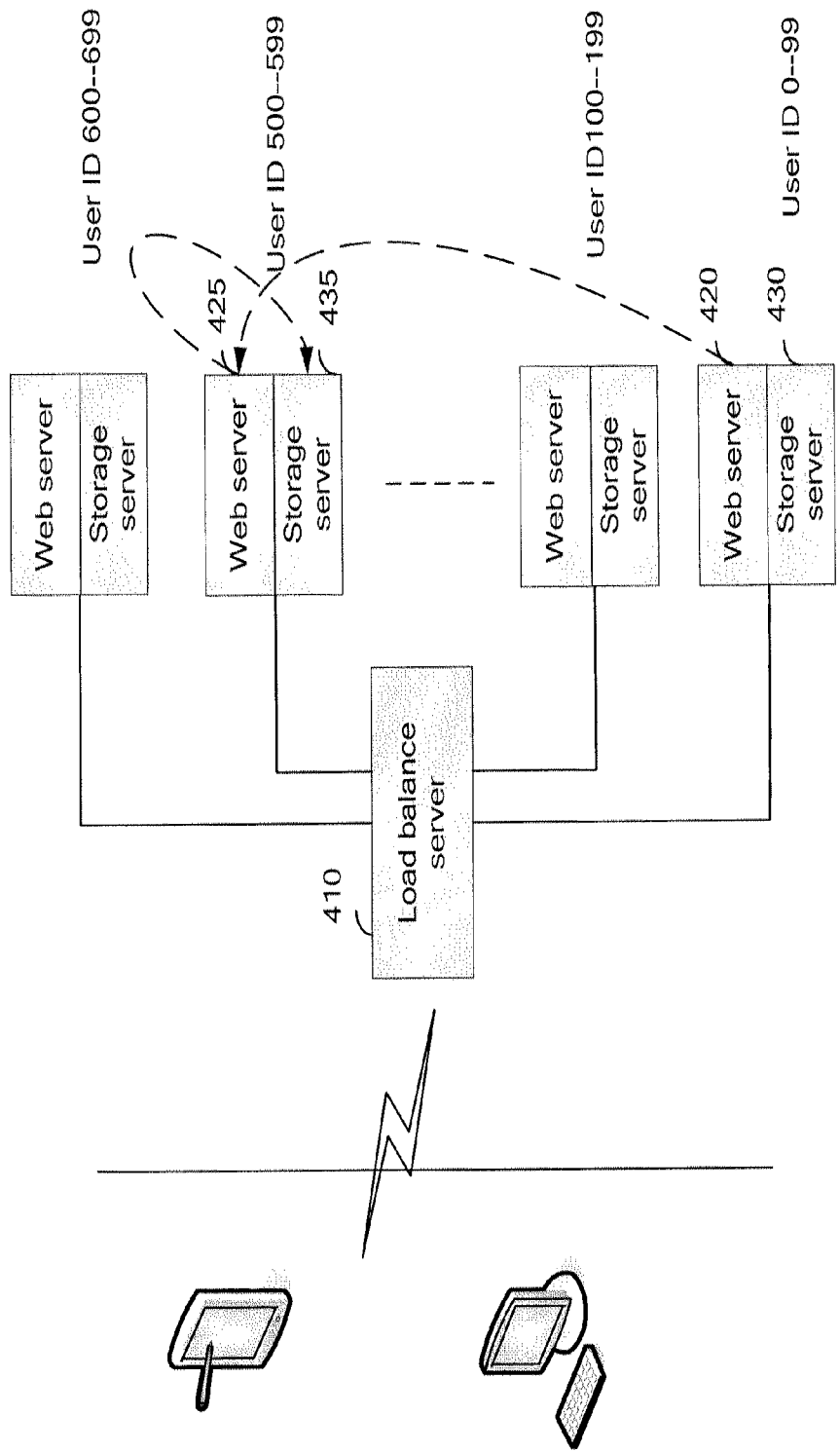
FIG. 4 is a diagram illustrating an example of collaboration of the web server and the storage server shown in FIG. 1.

In FIG. 4, every web server has its own storage server. The data are stored in those storage servers according to user ID, for example, every 100 users' data are stored in one storage server, the data owned by user No. 0-99 is stored in first storage server, the data owned by user No. 100-199 is stored in second storage server, and so on. As shown in FIG. 4, the data owned by USER 0 to USER 99 is stored in the storage server 430, and the load balance server 410 will forward the requests of any user among USER 0 to USER 99 to the web server 420, and the web server 420 accesses the storage server 430 to obtain the data user requests. Supposing that USER 501 share a document stored in the storage server 435 with USER 0, in this case, the physical document is stored in storage server 435 and need not stored in the storage server 430, and now if USER 0 initiate a request to view the document shared by USER 501, the whole process may include: the load balance server 410 forward the request to the web server 420, and the web server 420 will find the requested document is owned by USER 501, so the web server 420 will further request the web server 425 to provide the document. After the web server 425 verifies the request (whether USER 0 has right to access), it then obtains the document from the storage server 435 and returns the document to the web server 420 for further processing.

In this situation, every storage server need not large storage volume and heavy load, service provider can choose very cheap server, even can be a DAS of the web server. If the traffic of the web-based document service increases abruptly, just add the web server and a corresponding storage server, and store the data of new users in the new storage server. It is very easy and cheap to expand the performance of the whole service, and the expand ability is unlimited.

In one embodiment of the web-based document service, users can share documents with other users, and set the sharing permissions/authorities. For example, a user can set access privileges on his/her own document for another user.

In one embodiments of the web-based document service, URL for each document is provided for distribution. Especially, a linked-document (a document mainly contains URL of the actual document, when it is opened, the actual document referred by the URL will be opened automatically) is provided for distribute so that the storage and bandwidth can be saved. In a specific example, when a user share a document with another user via the web-based document service, the web service will send an email to the receiver in the name of the sender via a SMTP server. URL of involved document can be used to replace traditional attachment, When the recipient receive the email and click the URL in the email, the shared document is opened in the browser (sometimes a log in process may be required), the user can read or further process the document. In some cases, a copy of the shared document is copied to the recipient's storage space in the web-based document service. Optionally, there may be a very small (normally less than 1K byte) attachment of linked-document which contains URL of the shared document, click and open the linked-document is equal to click and open the corresponding URL.

In an embodiment, a visible signature function is also provided. The visible signature is bound with an electronic signature, and the visible signature is displayed only when corresponding electronic signature is verified, otherwise the visible signature can not be displayed normally. This ensures reliability, as much as possible reliable on the basis of convenient operation.

In one embodiment, the uploaded files are stored in original document storage 144, user is able to download uploaded files to client side. User can submit this request from backup client 114 to web server 120, the web server 120 obtains the specified file from original document storage 144 and submit it to backup client 114. User can submit the download request from browser 112 or browser 152 to web server 120, same process.

In one embodiment, the user can download documents stored in the cloud in PDF or other format. In this case, the web server 120 need convert the data stored in storage server 130 to the specific format; the other process is same as above.

In all of above embodiments, view function of printable document is provided. Furthermore, the printable documents also can be edited. Another embodiment is to provide a method and system for editing printable documents online or offline.

There are two kinds of editing. One is writing, means appending new contents without altering the existing content of the document, another is modifying, means the existing content is possible to be modified.

In an embodiment, the universal data is composed by pages, a page is composed by layers, each time after the user writes new content, a new layer is created to be inserted the universal data corresponding to the new content. Furthermore, the service can provide tracking history function by selecting which layers are displayed.

In an embodiment, newly edited contents are recorded and inserted as a new layer, i.e., the visual appearance information of the newly edited contents is abstracted and recorded in the language which can be rendered by the browser, and then the recorded information is integrated into the original universal data. This feature is also useful for version management. Newly edited contents are always considered as a layer of the universal data, so that it at least allows a path back to the historical version by layers when providing the function of version management.

A variety of editing tools (especially third-party on-line editor, or editing software at the client side) is also provided to allow users choices. For users, they only consider the differences between the editing functions among the different editing tools, without the need to consider the document format.

Editing functions such as inserting text (fonts, font size, bold, italic) can be set in any position of the document, and functions for inserting a picture or handwriting are provided. Basic document management functions, such as creating directories, deleting directories, moving files, deleting files, and search are also provided.

Figure 5:
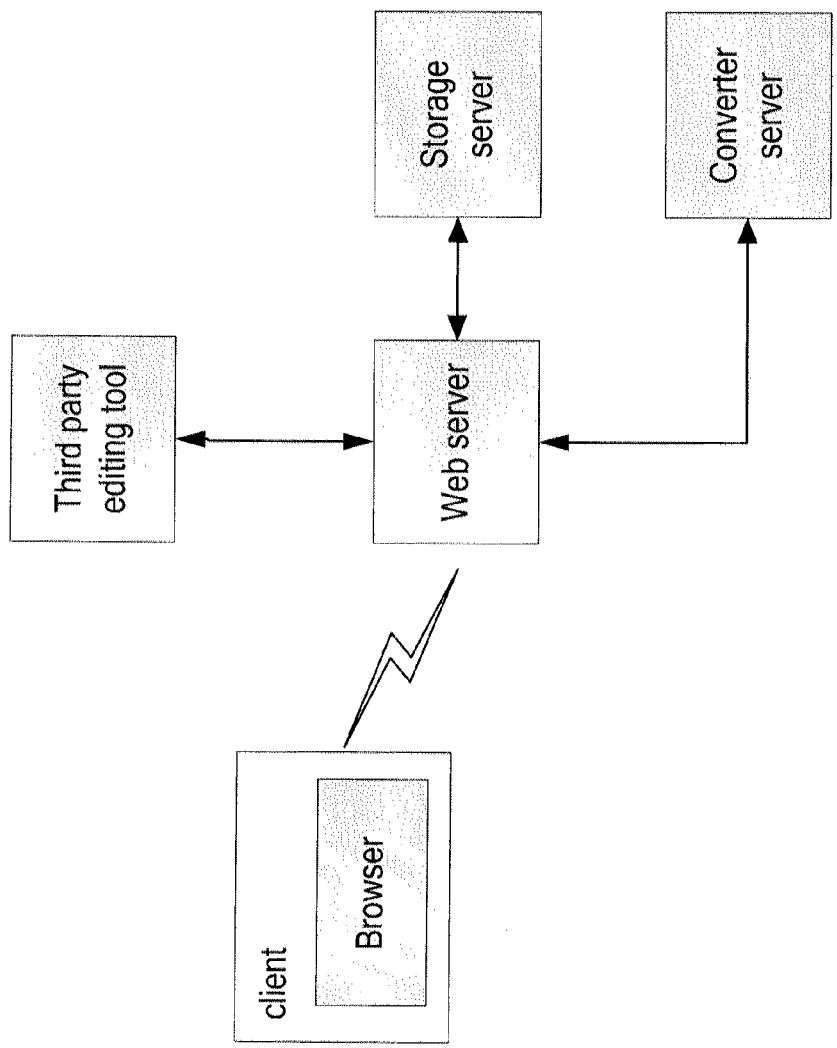
FIG. 5 is an example of system illustrating how to cooperate with the third party editing tools.

FIG. 5 is another system illustrating how to cooperate with the third-party editing tools. In system 500, the web server convert the document to the format supported by the third party editing tool, submits the converted data to third party editing tool, invokes the third party editing tool to edit it (those skilled in the art can imaging that the web page may jump to the third-party editing tool's web page when a user uses the third-party editing tool for editing), retrieves the edited document, converts the new document to universal data, stores the universal data (might together with the new document) to storage server.

In one embodiment, the web server retrieves the newly edited content, invokes the converter server to convert the new content to universal data, and merges the universal data of new content with the universal data of pre-editing document. One method of merging is: the web server creates a new layer, inserts the universal data of new content into the new layer.

In one embodiment, the method of converting document to the format supported by the third party editing tool is: renders the universal data, obtains the page bitmap of each page of the document, saves the page bitmap into the image format supported by the third party editing tool, creates a document in the format supported by the third party editing tool, in which one image per page, and the image of each page is the one prior obtained. In this case, retrieving new edited content is as simple as deleting the original image. Optionally, these images are set as read only background, can not be modified when editing by the third party editing tool.

In an embodiment, the language recording the visual appearance information is SVG; the newly edited contents are converted and stored as a SVG object, and the SVG object of the newly edited contents and the SVG document of the original page are both displayed in the browser of the client after the editing finishes.

In an embodiment, a user can create a new document online; in this case, the method of editing is the same as in the above embodiment, except the original document is a blank image.

In an embodiment, a browser supported format may be HTML, SVG, or an image.

Furthermore, a WebDAV protocol is supported. In this situation, the data in the online document accessing the application of the document in the server of the web-based document service can be viewed through explorer, just like pictures in a digital camera.

Several documents with the same file name but with different extensions can be listed in the explorer (Windows Explorer or similar shell of Windows or other OS) for each original document. In an embodiment, those documents with different extensions may be virtual documents without contents. When a user wants to open or edit the original document, they can choose a document with an extension supported by their favorite editing software. When a document is chosen, contents with the same layout information of the original document and in a format consistent to the extension are generated and presented to the user. In an embodiment, the contents are generated as OLE objects (e.g., an OLE object is created to refer to a page of aaa.sep and then inserted into the aaa.doc, and the number of OLE objects is the same as the number of pages) or images. After that, a user can edit the chosen document by using their favorite editing software, and then the document edited is saved at the server and the newly edited content is retrieved and inserted into the original document. In another embodiment, all documents with the same file name are updated during synchronization.

For example, if there is a document named aaa.sep, i.e., whose format is SEP, when presenting it to the users, different documents named, such as aaa.doc, aaa.ppt, aaa.xls, aaa.odt, are also listed for the user. Now a user with MS Word software can choose aaa.doc to open and edit. The aaa.doc has the same layout information of the aaa.sep, and it can be generated in advance, or at the time the user clicks to open it. After the user finishes the editing work on aaa.doc, the new aaa.doc is saved on the server and the newly edited content is automatically retrieved and inserted into the aaa.sep document. In another embodiment, aaa.ppt, aaa.xls, and aaa.odt are also updated according to the newly edited contents, i.e., documents with the same file name (but with a different extension) always have the same layout.

So, by using the web-based document service, the user can edit contents regardless of format or it can be said that the user can edit any contents by using their favorite editing software. In addition, the editing experience is more similar to the editing experience the user is familiar with.

In an embodiment, a universal data operation interface (such as a docbase interface like UOML) is provided, so that the data in the web-based document service can be accessed (for example, can be opened and edited) by the third-party application; in this embodiment, the third-party application can access not only the document-level data, but also fine-grained data in the lower level.

Although all of above diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and that the multiple hosts can be connected by one or more networks.

As used herein, the term engine in the embodiments refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

Although methods/figures in the above embodiments depict functional steps in a particular order for purposes of illustration, the process is not limited to any particular order or arrangement of steps. One skilled in the relevant art will appreciate that the various steps portrayed in those methods/figures could be omitted, rearranged, combined and/or adapted in various ways.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A method of providing web-based document, comprising:
    retrieving visual appearance of a document;
    saving the retrieved visual appearance into universal data and storing the universal data of the document in a server;
    wherein, the universal data records post-typesetting information of the document with no re-typesetting of any part of the universal data needed for presenting the document;
    converting by the server, when the document is requested through a web browser of a client, the stored universal data into a format which can be rendered by the web browser of the client, wherein the converted data of the document records post-typesetting information of the document with no re-typesetting of any part of the universal data needed for presenting the document;
    sending, by the server, a web page containing converted data to the web browser of the client; wherein, the web page containing converted data would be displayed by the client through its web browser;
    the method further comprising: converting the universal data of the document to the format supported by an editing tool; receiving the converted document edited by the editing tool; converting the edited document to universal data; storing the universal data of the edited document in the server.

2. The method according to claim 1, wherein, the visual appearance of the document is layouts of the document, and the universal data accurately describes layout of the document.

3. The method according to claim 1, wherein, the universal data is Scalable Vector Graphics SVG format, and each page of document forms one SVG object.

4. The method according to claim 1, further comprising:
    appending new content without altering the existing content of the document;
    retrieving, by the server, the newly edited content;
    converting the new content to universal data;
    merging the universal data of new content with the universal data before editing.

5. The method according to claim 4, wherein, the universal data is composed by pages, a page is composed by layers;
    and merging the universal data of new content with the universal data before editing comprises:
    creating a new layer;
    inserting the universal data of new content into the new layer.

6. The method according to claim 5, wherein, a tracking history function is provided by selecting which layers are displayed.

7. The method according to claim 1, wherein, converting the document to the format supported by an editing tool comprises:
    obtaining the page bitmap of each page of the document by rendering the universal data of the document;
    saving the page bitmap into an image which format is supported by the editing tool;
    creating a document in the format supported by the editing tool, each page of which includes a corresponding image containing the page bitmap of each page of the original document.

8. The method according to claim 7, wherein, the universal data is composed by pages; a page is composed by layers; and
    converting the edited document to universal data comprises:
    creating a new layer of universal data before editing;
    retrieving visual appearance information of the edited document;
    inserting the retrieved visual information into the new layer.

9. The method according claim 1, wherein, files with different extensions are listed for each document; and the editing tool is determined by choosing the file with extension supported by the editing tool.

10. The method according to claim 1, further comprising:
    receiving, by the server, the document from a third party storage service before the server retrieving visual appearance of the document.

11. The method according to claim 1, wherein, when a document is shared to a user from another user, the URL of the shared document is generated, the shared document is opened in the web browser of the user's client.

12. The method according to claim 1, wherein, a URL of the document is generated, and a linked document containing the URL is generated to transfer the document.

\* \* \* \* \*